(No Model.)
T. PEPPLER.
PORTABLE SPRAYING OR SPRINKLING MACHINE.
No. 510,287. Patented Dec. 5, 1893.
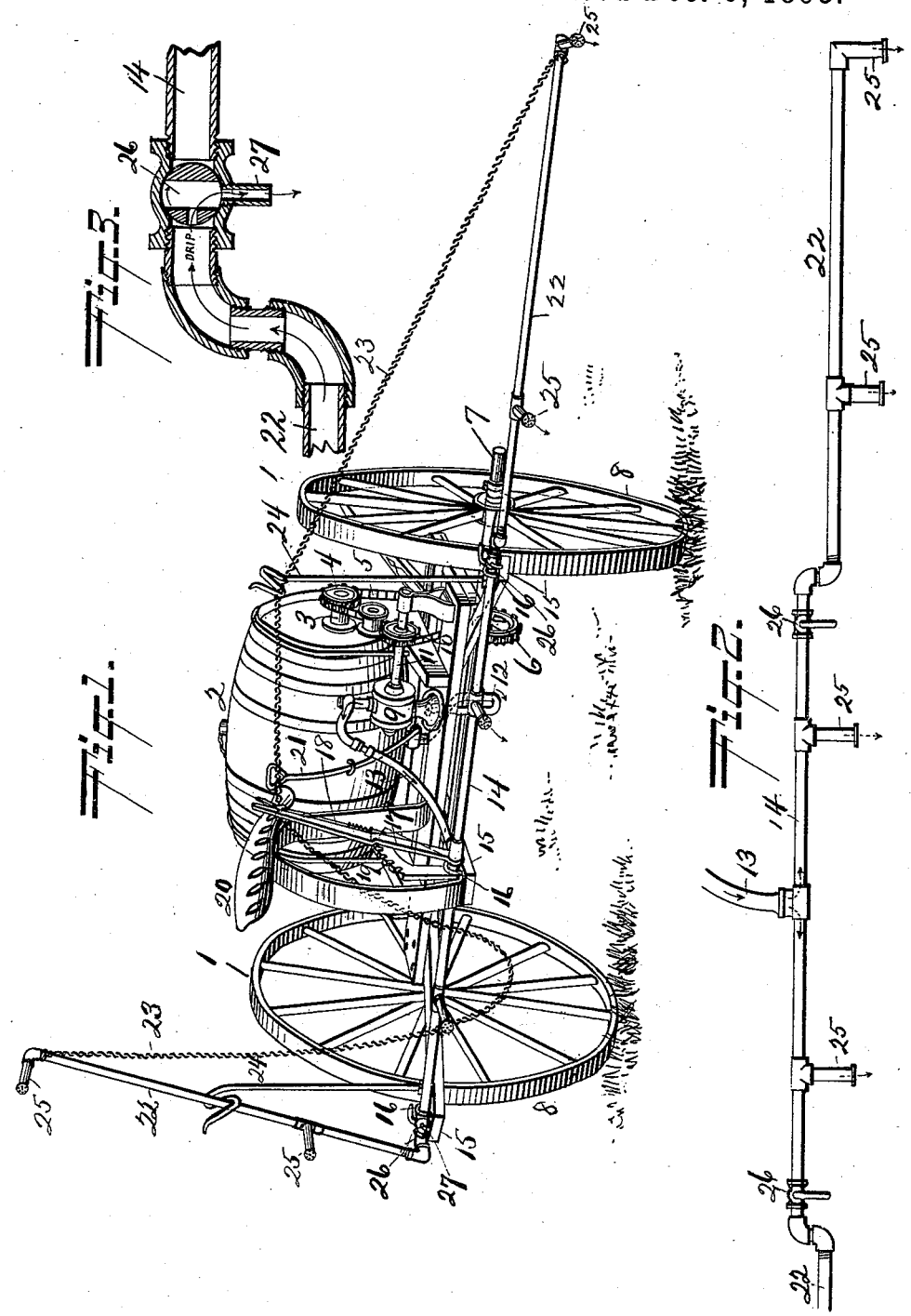
Attest:
F. H. Schott
Alfred T. Gage
Inventor
Thomas Peppler,
by R. S. Henderson,
Attorney.

UNITED STATES PATENT OFFICE.

THOMAS PEPPLER, OF HIGHTSTOWN, NEW JERSEY.

PORTABLE SPRAYING OR SPRINKLING MACHINE.

SPECIFICATION forming part of Letters Patent No. 510,287, dated December 5, 1893.

Application filed May 23, 1893. Serial No. 475,263. (No model.)

*To all whom it may concern:*

Be it known that I, THOMAS PEPPLER, a citizen of the United States, residing at Hightstown, in the county of Mercer and State of New Jersey, have invented certain new and useful Improvements in Portable Spraying or Sprinkling Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a machine for spraying or sprinkling vines, plants, and trees and is particularly adapted for use in applying paris green or other insect poison in water although it may be used for sprinkling or irrigating purposes generally about the farm.

It has for its object the production of a machine capable of sprinkling or spraying six rows or more at a time and yet capable of spraying a less number of rows when occasion requires.

In carrying out my invention I employ a main tube or pipe provided with a series of spray nozzles arranged in such a manner that when desired six rows or more can be sprayed at one and the same time, the main pipe being formed in sections connected to one another in such a manner that the end sections may be lifted from a horizontal to an upright plane so as to lessen the number of spray nozzles to be in action and at the same time move the end sections so that they will not interfere with plants or obstructions that may be in the line of travel of the spray or sprinkling cart.

A form of my invention found after long experience to be the best adapted for the purposes in view will be hereinafter fully described and illustrated reference being had to the accompanying drawings forming a part hereof and in which—

Figure 1 is a perspective of a spraying or sprinkling cart having my attachment applied thereto. Fig. 2 is a plan view of the pipe or tube with its nozzles for distributing the liquid; Fig. 3 a horizontal section on an enlarged scale through a portion of the liquid distributing pipes.

In the drawings the numeral 1 indicates a cart of any approved form and construction which carries a water tank or reservoir 2 to contain the liquid to be sprayed or sprinkled, which tank or vessel will as is commonly practiced contain a stirrer (not shown) secured to the sprocket wheel 4 over which passes a sprocket chain 5 through which motion is transmitted to the stirrer from a sprocket wheel 6 on the rotary axle 7 on which turn the wheels 8 of the cart. These carts may be such as are ordinarily in use and as they form no part of this invention need not be more clearly illustrated or described.

In connection with the liquid tank I employ preferably a pump, either a hand pump or a rotary pump of any approved pattern, for the purpose of forcing the liquid delivered from the tank through the delivering pipe. I have illustrated however a rotary pump indicated by the numeral 9 which has a sprocket wheel 10 on a shaft 11 extending from the pump with which sprocket wheel 10 engages sprocket chain 5 so as to transmit motion to the pump from the driving wheels of the cart. This pump receives the water from the tank through a pipe 12 and delivers it through a pipe 13 to the central or main distributing pipe 14, the pipe 13 being preferably of rubber or other flexible material so that it may yield to the rotary movement of the pipe 14. The pipe 14 is sustained by suitable supports for instance by bars 15 to which the pipe may be held by staples 16 applied in a manner that will allow the pipe 14 to be turned upon its axis whenever it is desired to change the direction of the spraying liquid so that said liquid may be thrown either downward or at any angle below or above the horizontal plane of the axis of the pipe so that the liquid may be directed to any particular point desired. For the purpose of turning this pipe 14 I may employ a lever 17 connected to said pipe and having a spring actuated pawl 18 adapted to engage with a notched segment 19 suitably secured upon the frame of the cart so that by turning the lever 17 the pipe may be turned to the angle desired and held at that angle by the spring pawl engaging any one of the teeth of the segment. This lever is arranged preferably convenient to the seat 20 occupied by the driver, and within easy reach of the seat is arranged a lever 21 connected at its lower end with a valve in the pipe leading from the water or liquid tank so that whenever desired the water may be turned off from said tank or its flow therefrom regulated. This valve operating lever however is not claimed in this application and therefore need not be more clearly illustrated. Any form of valve and lever well known may be used for the purpose.

The difficulty heretofore experienced in getting a spraying machine that would spray six or more rows at one time has been that the liquid distributing tube would be so long that in very many cases it would interfere with the advancement of the watering cart because of interference with trees, plants or other obstructions in the line of travel of the cart. Because of that difficulty it has been the practice to employ short liquid distributing tubes of such length that they would not extend so as to be interfered with in the progress of the machine. To enable a machine however to be employed which can sprinkle six or more rows at the same time I have devised a construction of liquid distributing tube or pipe shown which consists in connecting an auxiliary or end liquid distributing pipe 22 to the main or central distributing pipe 14 by means of a joint which will permit the end or auxiliary tubes or pipes to be lifted from a position beyond the side of the cart and parallel with the main pipe into an upright position above the level of the main pipe when necessary as indicated at the left of Fig. 1 of the drawings. Under this construction I can employ at one time six or more spraying or sprinkling nozzles arranged so as to spray the six or more rows of plants. It is obvious that there may be additional spraying nozzles added so as to spray more than six rows although usually in practice that will be the maximum number it will be desirable to spray at one time. This construction also permits me to employ when necessary only two or four of the nozzles as it is evident that when one end pipe is elevated there will remain four nozzles in use, and when desired the other end may be raised and then only two nozzles will be left in position for operation. The advantages of this construction will be appreciated by the truck farmer who has occasion to use sprinkling or spraying machines.

The form of coupling I prefer to use between the auxiliary or end tubes or pipes and the main liquid pipe is that illustrated which consists in two elbows one on the end of the main pipe and the other on the end of the distributing pipe connected together by a short nipple, as illustrated in Fig. 3, which will permit the auxiliary or end pipe to be lifted at right angles to the length of the main liquid distributing pipe 14, as illustrated at the left of Fig. 1. I prefer to employ at or adjacent to this joint a valve or pet-cock 26 by which the flow of water through the auxiliary pipe may be cut off when desired, said pet-cock having a drip pipe 27 for the drain of water from the end pipe when the flow of water into the same from the main pipe is cut off. This construction however is not essential to the operation of the invention.

As a means for lifting the auxiliary or end pipe I employ preferably a chain 23 connected at opposite ends to the outer ends of the auxiliary pipes and at an intermediate point to the seat occupied by the driver or at some point adjacent thereto so as to be within the easy reach of the driver. When it is desired to elevate the auxiliary end it is only necessary to pull on this chain when the end is raised to the position shown in the left of Fig. 1 of the drawings. When the end pipe is thus elevated it is supported by an arm 24 preferably formed with a hook at its extreme end or point which may serve as a guide for the lifting chain 23 when the lower end of the pipe is lowered and also as a guide against the end pipe being swayed back and forth when in its elevated position. This hooked end of the arm 24 will be of such form, for instance substantially as illustrated, that it will receive and sustain the auxiliary end no matter at what angle of inclination the spray or nozzles indicated by the numeral 25 may stand. The connection of the auxiliary pipes 22 with the main pipe is also such that when the auxiliary pipes are raised they may be turned so that the spray nozzles will project at right or other angle to the position shown in Fig. 1 of the drawings and outwardly so as to throw the spray against vines or plants at opposite sides of the spraying machine so that by passing between two rows of vines in a vineyard two rows may be sprayed at the same time. This adjustment may be effected by threading the lower portion of the auxiliary pipes so that they may be turned in the threaded elbow couplings into which they are screwed as indicated in Figs. 1 and 3 of the drawings.

This machine from actual operation in the field has been demonstrated to work in the most satisfactory manner and to possess the requirements of a machine for sprinkling or spraying six or more rows at one time. It is also easily manipulated, and being simple in construction and composed of comparatively few parts is not liable to get out of repair and has a very extended life.

I have described with particularity what I consider to be the best construction of the several details of the parts entering into the construction of the machine but I do not wish to be understood as limiting myself to the exact details illustrated as it is obvious that variations may be made therefrom without departing from the spirit of my invention.

Having described my invention and set forth its merits, what I claim is—

1. In a portable spraying machine, the combination with the liquid containing tank, a liquid distributing pipe, and a pipe for establishing communication between said tank and liquid distributing pipe, of an auxiliary liquid distributing pipe extending longitudinally of the main distributing pipe and having a hinged connection therewith to adapt it to be swung simultaneously upward above the main distributing pipe and inward toward the side of the machine, substantially as and for the purposes described.

2. In a portable spraying machine, the combination with the liquid tank and the main distributing pipe having communication therewith, of an auxiliary liquid distributing pipe extending longitudinally of the main distributing pipe and having a hinged connection therewith to adapt it to be swung simultaneously upward above the main distributing pipe and inward toward the side of the machine, and a support located to have said pipe brought into engagement with it when raised to sustain said pipe in its raised position, substantially as and for the purposes described.

3. In a portable spraying machine, the combination with the liquid tank and main distributing pipe in communication therewith and supported upon bearings permitting it to turn, of an auxiliary distributing pipe extending longitudinally of said main pipe and having a hinged connection with said main distributing pipe and in communication therewith, and adapted to be turned with said main pipe, means for sustaining said auxiliary distributing pipe when raised at an angle to said main distributing pipe, and spraying nozzles located both upon the main and upon the auxiliary liquid distributing pipes, substantially as and for the purposes described.

4. In a spraying machine, the combination with the liquid tank and the main distributing pipe having communication therewith, of an auxiliary distributing pipe extending longitudinally of said main pipe and connected with said pipe by means permitting the said auxiliary pipe to be swung simultaneously upward and inward toward the side of the machine and turned to throw the liquid laterally, substantially as and for the purposes described.

In testimony whereof I affix my signature in presence of two witnesses.

THOMAS PEPPLER.

Witnesses:
A. E. APPLEGATE,
C. W. WRIGHT.